(12) United States Patent
Shimokawa et al.

(10) Patent No.: US 6,184,300 B1
(45) Date of Patent: Feb. 6, 2001

(54) BOWL-SHAPED POLYMER PARTICLES, AQUEOUS DISPERSION OF POLYMER PARTICLES, PROCESSES FOR PRODUCING THESE, AND THERMAL RECORDING MATERIAL

(75) Inventors: Yoshiharu Shimokawa, Yokohama; Osamu Ishizu, Kawasaki, both of (JP)

(73) Assignee: Nippon Zeon Co., Ltd., Tokyo (JP)

( * ) Notice: Under 35 U.S.C. 154(b), the term of this patent shall be extended for 0 days.

(21) Appl. No.: 09/367,048
(22) PCT Filed: Feb. 9, 1998
(86) PCT No.: PCT/JP98/00526
§ 371 Date: Aug. 6, 1999
§ 102(e) Date: Aug. 6, 1999
(87) PCT Pub. No.: WO98/34969
PCT Pub. Date: Aug. 13, 1998

(30) Foreign Application Priority Data

Feb. 7, 1997 (JP) .................................................... 9-039833
Feb. 7, 1997 (JP) .................................................... 9-039834

(51) Int. Cl.$^7$ .................................................. C08F 251/00
(52) U.S. Cl. ............................................................ 525/242
(58) Field of Search ............................................. 525/242

(56) References Cited
FOREIGN PATENT DOCUMENTS 2-14222 * 1/1990 (JP) .
5-222108 * 8/1993 (JP) .
WO98/34969 * 2/1997 (WO) .

* cited by examiner

*Primary Examiner*—Terressa M. Boykin
(74) *Attorney, Agent, or Firm*—Armstrong, Westerman, Hattori, McLeland & Naughton (57) ABSTRACT

Bowl-shaped polymer particles characterised by having a bowl-like shape as is formed by partly cutting along a plane each spherical hollow polymer particle having a void in the inside, and in which the cross-section perpendicular to the cut plane and passing through the center of the particle has a shape as is formed by partly cutting a double circle along a straight line, and the lengths H of the perpendiculars from the outer arc of the double circle in the cross-section to the straight line have a maximum value $H_{max}$ equal to or larger than the radius of the outer circle of the double circle. The bowl-shaped polymer particles have a multi-layer structure, and are produced by multi-stage polymerization in which monomer mixtures are successively polymerized in a manner such that the proportion of a monomer having an acidic group gradationally decreases and by treating the resultant polymer with a base. The bowl-shaped polymer particles are useful as a heat-insulating material, organic pigment, or opacifying agent, and especially as a heat-insulating interlayer to be formed in a thermal recording material.

22 Claims, 1 Drawing Sheet

BOWL-SHAPED POLYMER PARTICLES, AQUEOUS DISPERSION OF POLYMER PARTICLES, PROCESSES FOR PRODUCING THESE, AND THERMAL RECORDING MATERIAL

TECHNICAL FIELD

This invention relates to bowl-shaped polymer particles; an aqueous dispersion of polymer particles capable of, when it is dried, forming the bowl-shaped polymer particles; and processes for producing the bowl-shaped polymer particles and the aqueous polymer particle dispersion.

The bowl-shaped polymer particles of the present invention are used as a heat-insulating material, an organic pigment and an opacifying agent, and as ingredients to be incorporated in a material for forming a heat-insulating intermediate layer of a thermal recording material, an aqueous coating composition, a coating color for paper, and others.

BACKGROUND ART

It has been hitherto known that hollow polymer particles cause irregular reflection of irradiated light due to the presence of a void in the interior thereof, and thus, when the hollow polymer particles are coated on a material, whiteness of the material is enhanced and the material is made opaque.

It is considered that, as the diameter of the hollow polymer particles becomes large, the opacifying effect becomes prominent.

Polymer particles having a special shape, other than the hollow polymer particles, also are known as exhibiting an opacifying effect. For example, in Japanese Unexamined Patent Publication (hereinafter abbreviated to "JP-A") No. H5-222108, polymer particles having at least one through-hole extending from the particle surface to the interior thereof, which is formed when the particles are dried, and a process for producing the polymers are described. It is described therein that the polymer particles are usable as a coating composition and an organic pigment for paper coating color. However, the particle size of the polymer particles, produced by this process, are small, i.e., at most about 0.2 μm, and thus, the opacifying effect of the pigment is poor.

A thermal recording material has been proposed in JP-A H2-164580, which has a heat-insulating intermediate layer between a support and a thermal recording layer, wherein the intermediate layer contains porous and non-spherical hollow polymer particles having undulations on the surface which are formed by allowing hollow polymer particles to shrink. These non-spherical hollow polymer particles exhibit good thermal response, but have poor adhesion between the thermal recording layer and the support.

Another thermal recording material has been proposed in JP-A H5-573, which has a heat-insulating intermediate layer between a support and a thermal recording layer, wherein the intermediate layer contains spherical or ellipsoidal plastic hollow particles. The plastic hollow particles are fine foamed plastic hollow particles having an average particle diameter of 2.0 to 20 μm, preferably 3 to 10 μm. It is however difficult to prepare fine foamed plastic hollow particles which are uniform and have a narrow particle size distribution.

A further thermal recording material has been proposed in JP-A H2-57382, which has a heat-insulating intermediate layer between a support and a thermal recording layer, wherein the intermediate layer contains fine hollow polymer particles having a particle diameter of not larger than 5 μm, preferably 0.1 to 3 μm. These hollow polymer particles exhibit a poor effect for enhancement of thermal response, and further have problems of causing sticking and deposition of tailings on a thermal head.

Emulsified vinyl polymer particles have been proposed in JP-A-H2-14222, which have a flat shape, and at least one major surface of which is concave. It is described therein that these polymer particles are used as an additive for a paint, a paper coating color, or a coating color for information recording paper and other materials. It is however indispensable for the preparation of the polymer particles to conduct emulsion polymerization using a non-aqueous organic solvent such as an aliphatic hydrocarbon, and, after the completion of polymerization, to remove the organic solvent from the reaction system. Due to the flat shape, the polymer particles exhibit poor opacifying effect, and, where they are used for a thermal recording paper, they exhibit a poor heat-insulating effect.

DISCLOSURE OF INVENTION

An object of the present invention is to provide polymer particles having a special shape, which exhibit excellent heat-insulating effect, whiteness-enhancing effect, opacifying effect, and other effects.

Another object of the present invention is to provide a process for stably producing the polymer particles of a special shape.

Still another object of the present invention is to provide a thermal recording material, which exhibits excellent thermal response, high dynamic sensitivity, and good reproducibility of printed letter images, i.e., dots, and in which problems of causing sticking and deposition of tailings on a thermal head are minimized.

In one aspect of the present invention, there is provided bowl-shaped polymer particles characterized by having a bowl-like shape as is formed by partly cutting along a plane each spherical hollow polymer particle having a void in the inside, and in which the cross-section perpendicular to the cut plane and passing through the center of the particle has a shape as is formed by partly cutting a double circle along a straight line, and the lengths H of the perpendiculars from the outer arc of the double circle in the cross-section to the straight line have a maximum value $H_{max}$ equal to or larger than the radius of the outer circle of the double circle.

In another aspect of the present invention, there is provided an aqueous dispersion of polymer particles, which is capable of, when the aqueous dispersion is dried, producing the above-mentioned bowl-shaped polymer particles.

In still another aspect of the present invention, there is provided a process for producing bowl-shaped polymer particles, characterized by comprising the steps of:

(1) copolymerizing a monomer mixture comprising 30 to 65% by weight of an acidic group-containing monomer and 70 to 35% by weight of a monomer copolymerizable therewith to prepare a nucleus polymer particle;

(2) copolymerizing a monomer mixture comprising 10 to 35% by weight of an acidic group-containing monomer and 90 to 65% by weight of a monomer copolymerizable therewith in the presence of the nuclear polymer particle to prepare a core polymer particle substantially surrounding the nucleus polymer particle, wherein the content of the acidic group-containing monomer units in the core polymer particle is equal to or smaller than the content of the acid group-containing monomer units in the nucleus polymer particle;

(3) copolymerizing a monomer mixture comprising 1 to 12% by weight of an acidic group-containing monomer and 99 to 88% by weight of a monomer copolymerizable therewith in the presence of the nucleus/core polymer particle to form at least one intermediate polymer layer which substantially surrounds the nucleus/core polymer particle;

(4) polymerizing an aromatic vinyl monomer alone or copolymerizing a monomer mixture comprising up to 0.5% by weight of an acidic group-containing monomer and at least 99.5% by weight of an aromatic vinyl monomer copolymerizable therewith in the presence of the polymer particle which is prepared in step (3) and comprising the intermediate polymer layer substantially surrounding the nucleus/core polymer particle to prepare an outer polymer layer which substantially surrounds the polymer particle prepared in step (3);

(5) adding a base to an aqueous dispersion of the polymer particle which is prepared in step (4) and has a multi-layer structure comprising at least four layers, to adjust the pH value of the aqueous polymer dispersion to at least 7;

(6) adding an aromatic vinyl monomer or a monomer mixture comprising at least 90% by weight of an aromatic vinyl monomer and not larger than 10% by weight of a monomer copolymerizable therewith, to polymerize the aromatic vinyl monomer or copolymerize the monomer mixture in the presence of the polymer particle with the multi-layer structure, prepared in step (5), to form an outermost polymer layer surrounding the outer polymer layer prepared in step (4); and then, (7) drying the thus-prepared aqueous polymer dispersion.

In a further aspect of the present invention, there is provided a process for producing the above-mentioned aqueous dispersion of polymer particles, which is capable of, when the aqueous dispersion is dried, producing the bowl-shaped polymer particles; which process is characterized by comprising the above-mentioned steps (1) through (6).

In a still further aspect of the present invention, there is provided a thermal recording material having a thermal recording layer formed on a support, characterized in that an intermediate layer comprising heat-insulating polymer particles is formed between the thermal recording layer and the support; said polymer particles being the bowl-shaped polymer particles having a bowl-like shape as is formed by partly cutting along a plane each spherical hollow polymer particle having a void in the inside, and in which the cross-section perpendicular to the cut plane and passing through the center of the particle has a shape as is formed by partly cutting a double circle along a straight line, and the lengths H of the perpendiculars from the outer arc of the double circle in the cross-section to the straight line have a maximum value $H_{max}$ equal to or larger than the radius of the outer circle of the double circle.

BEST MODE FOR CARRYING OUT THE INVENTION

I. Bowl-Shaped Polymer Particle

Figure 1:
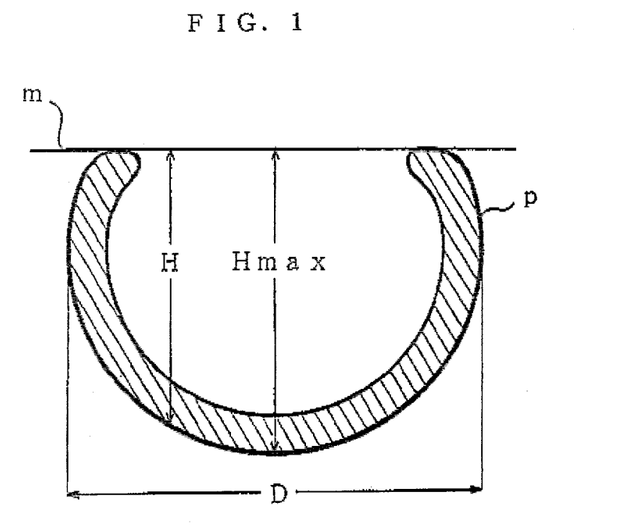
FIG. 1 shows a cross-section which is perpendicular to the opening plane and passes through the center of the bowl-shaped polymer particle of the present invention.

The bowl-shaped polymer particle of the present invention has a shape as is obtained by partly cutting along a plane approximately spherical hollow polymer particle having a void (i.e., vacant space) in the inside. A cross-section perpendicular to the cut plane and passing through the center of the particle has a shape, as illustrated in FIG. 1, as is formed by partly cutting a double circle along a straight line "m". In the cross-section shown in FIG. 1, among lengths H of the perpendiculars drawn from arbitrary points on the outer arc of the cross-section to the straight line m, the maximum length $H_{max}$ is equal to or larger than the radius (i.e., half of the diameter D) of the outer circle "p" of the double circle. In other words, the outer diameter of the bowl-shaped polymer particle is approximately the same as the outer diameter of a spherical hollow polymer particle as immediately before the formation of bowl-shape. The shape of the bowl-shaped polymer particle is a half of the spherical hollow polymer particle as immediately before the formation of bowl-shape, or larger than the half, namely, the shape is intermediate between a hemisphere and a sphere. Thus, the ratio of the outer diameter "D" of the bowl-shaped polymer particle to the maximum height $H_{max}$ is larger than 1, and equal to 2 or smaller (i.e., $1<D/H_{max}\leq 2$).

The wall of the bowl-shaped polymer particle becomes thick and inwardly overhang to a small degree. The wall thickness of the bowl-shaped polymer particle is about two times of that of the hollow polymer particles before the formation of the bowl-shape. The wall thickness in the vicinity of brim of the bowl-shaped polymer particle is about 10% to about 30% of the outer diameter D of the particle. The bowl-shaped polymer particle may either have a thin fattened void (i.e., a very thin vacant space) originating from the void in the inside of the hollow polymer particle before the formation of bowl-shape, or be solid without any vacant space.

The average maximum diameter of the bowl-shaped polymer particle is generally in the range of 0.3 to 5 μm, preferably 0.5 to 3 μm. The ratio of the average outer diameter of the opening brim (i.e., diameter of the brim including the wall thickness) of the bowl-shaped polymer particle to the average maximum diameter of the particle is generally in the range of 25 to 100%, preferably 60 to 95%.

II. Production of Bowl-Shaped Polymer

The bowl-shaped polymer particle of the present invention has a wall which is usually of a multi-layer structure, and is made by a multi-stage polymerization process comprising the following steps (1) to (7).

(1) A monomer mixture comprising 30 to 65% by weight of an acidic group-containing monomer and 70 to 35% by weight of a monomer copolymerizable therewith is copolymerized to prepare a nucleus polymer particle.

(2) A monomer mixture comprising 10 to 35% by weight of an acidic group-containing monomer and 90 to 65% by weight of a monomer copolymerizable therewith is copolymerized in the presence of the nucleus polymer particle, prepared in step (1), to prepare a core polymer particle substantially surrounding the nucleus polymer particle, wherein the content of the acidic group-containing monomer units in the core polymer particle is equal to or smaller than the content of the acid group-containing monomer units in the nucleus polymer particle.

(3) A monomer mixture comprising 1 to 12% by weight of an acidic group-containing monomer and 99 to 88% by weight of a monomer copolymerizable therewith is copolymerized in the presence of the nucleus/core polymer particle, prepared in step (2), to form at least one intermediate polymer layer which substantially surrounds the nucleus/core polymer particle;

(4) An aromatic vinyl monomer is polymerized alone or a monomer mixture comprising up to 0.5% by weight of an acidic group-containing monomer and at least 99.5% by weight of an aromatic vinyl monomer copolymerizable therewith is copolymerized, in the presence of the polymer particle which is prepared in step (3) and comprising the intermediate polymer layer substantially surrounding the nucleus/core polymer particle, to prepare an outer polymer layer which substantially surrounds the polymer particle prepared in step (3).

(5) A base is added to an aqueous dispersion of the polymer particle, which is prepared in step (4) and has a multi-layer structure comprising at least four layers, to adjust the pH value of the aqueous polymer dispersion to at least 7.

(6) If desired, the pH value of the aqueous polymer particle dispersion is adjusted below 7, and then, an aromatic vinyl monomer alone or a monomer mixture comprising at least 90% by weight of an aromatic vinyl monomer and not larger than 10% by weight of a monomer copolymerizable therewith is added, to polymerize the aromatic vinyl monomer or copolymerize the monomer mixture in the presence of the polymer particle with the multi-layer structure, prepared in step (5), to form an outermost polymer layer surrounding the outer polymer layer prepared in step (4).

(7) The thus-prepared aqueous polymer dispersion is dried.

An assembly of multiplicity of bowl-shaped polymer particles with wall having a multi-layer structure is made by the above-mentioned process. The assembly of the bowl-shaped polymer particles usually contains smaller than about 20% by weight of polymer particles having other shapes, which do not satisfy the above-mentioned definition for the bowl-shaped polymer particle.

The above-mentioned multi-stage polymerization process for producing the bowl-shaped polymer particles with wall having a multi-layer structure will now be described in detail.

Preparation of Nucleus Polymer Particle [Step (1)]

The nucleus polymer particle is prepared by copolymerizing a monomer mixture comprising 30 to 65% by weight, preferably 30 to 55% by weight, of an acidic group-containing monomer and 70 to 35% by weight, preferably 70 to 45% by weight, of a monomer copolymerizable therewith. If the amount of an acidic group-containing monomer is too small, a base does not easily penetrate the polymer particle in the base-treating step (5) and it is difficult to form a void within the polymer particle, and consequently, the bowl-shaped polymer particle is difficult to prepare. In contrast, if the amount of an acidic group-containing monomer is too large, the nucleus polymer particle has a tendency of shifting from the center to the outside of the intermediate polymer layer and the outer polymer layer, and the polymerization stability becomes poor.

The acidic group-containing monomer used herein means a monomer having a functional group exhibiting acidity, and, as specific examples thereof, there can be mentioned ethylenically unsaturated carboxylic acids such as acrylic acid, methacrylic acid, crotonic acid, cinnamic acid, itaconic acid, fumaric acid, maleic acid and butenetricarboxylic acid; monoalkyl esters of unsaturated dicarboxylic acids such as monoethyl itaconate, monobutyl fumarate and monobutyl maleate; and sulfonic acid group-containing monomers such as styrenesulfonic acid. These acidic group-containing monomers may be used either alone or as a combination of two or more thereof. With a monomer having a strong acidity, the acidic group tends to shift to the outside of the polymer particle, and it becomes difficult that the core polymer and the intermediate polymer layer cover the nucleus polymer particle, and consequently, the bowl-shaped polymer particle becomes difficult to prepare.

Of the acidic group-containing monomers, monocarboxylic acids and monoesters of dicarboxylic acids are preferable. Methacrylic acid is most preferable.

As specific examples of the monomer copolymerizable with the acidic group-containing monomers, there can be mentioned aromatic vinyl monomers such as styrene, α-methylstyrene, p-methylstyrene and halogenated styrenes; acrylic acid esters and methacrylic acid esters such as methyl acrylate, methyl methacrylate, ethyl acrylate, ethyl methacrylate, butyl acrylate, butyl methacrylate, 2-ethylhexyl acrylate, 2-ethylexyl methacrylate, lauryl acrylate, lauryl methacrylate, glycidyl acrylate, glycidyl methacrylate, 2-hydroxyethyl acrylate and 2-hydroxyethyl methacrylate; acrylamide, methacrylamide and their derivatives such as acrylamide, methacrylamide, N-methylolacrylamide, N-methylol-methacrylamide, N-butoxymethylacrylamide and N-butoxymethyl-methacrylamide; diene monomers such as butadiene and isoprene; a vinyl ester of carboxylic acids such as vinyl acetate; vinyl halides such as vinyl chloride; vinylidene halides such as vinylidene chloride; and vinylpyridine. Of these, acrylic acid esters and methacrylic acid esters are preferable. These monomers may be used either alone or as a combination of two or more thereof.

If desired, a cross-linking monomers such as divinylbenzene, diallyl phthalate, allyl acrylate, allyl methacrylate, ethylene glycol diacrylate and ethylene glycol dimethacrylate may be used. However, it should be noted that, when a cross-linking monomer is sued in a salient amount, the bowl-shaped polymer particle is difficult to prepare, and thus, the amount thereof should be within the range wherein stable voids can be formed.

As the polymerization procedure for preparing the nucleus polymer particle, an emulsion polymerization procedure is usually employed. But, phase inversion may be employed for inverting a polymer prepared by other polymerization procedure into a latex. The polymerization may be carried out by a batchwise, semi-continuous or continuous polymerization process. The polymerization temperature may be either high or low. The polymerization pressure and time are not particularly limited, and conventional conditions may be employed. Known auxiliaries may be used, which include emulsifiers, polymerization initiators, chelating agents, electrolytes, molecular weight modifiers and surface active agents. A seed is preferably used for the preparation of the nucleus polymer particle for easily controlling the size of the nucleus polymer particle. The composition of seed is not particularly limited. The conversion of monomers in the polymerization is usually at least 90%, and preferably at least 97%. The composition of the resulting copolymer is approximately the same as the composition of the monomer mixture used.

Preparation of Core Polymer Particle [Step (2)]

The core polymer particle is obtained by copolymerizing a monomer mixture comprising 10 to 35% by weight, preferably 15 to 35% by weight, of an acidic group-containing monomer and 90 to 65% by weight, preferably 85 to 65% by weight, of a monomer copolymerizable therewith in the presence of the nucleus polymer particle, prepared in step (1). The content of the acidic group-containing monomer units in the core polymer particle should be equal to or smaller than the content of the acid group-containing monomer units in the nucleus polymer particle. If the content of the acidic group-containing monomer units is too small, a base does not easily penetrate the polymer particle in the base-treating step (5) and the bowl-shaped polymer particle is difficult to prepare. In contrast, if the content of the acidic monomer units is too large, the core polymer particle has a tendency of shifting from the center to the outside of the intermediate polymer layer and the outer polymer layer, the stability of as-produced polymer becomes poor and the bowl-shaped polymer particle is difficult to prepare.

As specific examples of the acidic group-containing monomer and the monomer copolymerizable therewith, there can be mentioned those which are recited as for the preparation of The nucleus polymer particle. These monomers may be used either alone or as a combination of two or more thereof.

If desired, a minor amount of a cross-linking monomer can be used. As the procedure for polymerization, an emulsion polymerization procedure is usually employed, as the polymerization for the nucleus polymer particle. The polymerization process (batchwise, semi-continuous or continuous), polymerization conditions and auxiliaries may be selected from those which are known, similarly to the case of the preparation of the nucleus polymer particle.

The monomer mixture for forming the core polymer particle is used in an amount such that the amount of the nucleus polymer particle is in the range of 1 to 25 parts by weight, preferably 3 to 20 parts by weight, based on 100 parts by weight of the core polymer particle. If the relative amount of the nucleus polymer particle is too large, the bowl-shaped polymer particle is difficult to prepare. In contrast, the relative amount of the nucleus polymer particle is too small, the polymerization stability is reduced.

The thus-prepared nucleus/core polymer particle has a particle diameter in the range of preferably 150 to 500 nm, and more preferably 200 to 400 nm. When the polymer particle size is smaller, the bowl-shaped polymer particle is difficult to prepare. When the polymer particle size is larger, the polymerization stability becomes poor.

Formation of Intermediate Polymer Layer [Step (3)]

The intermediate polymer layer is formed by copolymerizing a monomer mixture comprising 1 to 12% by weight, preferably 2 to 10% by weight, more preferably 3 to 9% by weight, of an acidic group-containing monomer and 99 to 88% by weight, preferably 98 to 90% by weight, more preferably 97 to 91% by weight, of a monomer copolymerizable therewith in the presence of the nucleus/core polymer particle. If the amount of the acidic group-containing monomer is too small, a base does not easily penetrate the polymer particle in the base-treating step (5) and the bowl-shaped polymer particle is difficult to prepare. In contrast, if the amount of the acidic monomer units is too large, the polymerization stability becomes poor. The ratio of the core polymer particle to the intermediate polymer layer is usually in the range of 5/95 to 60/40 by weight, and preferably 10/90 to 50/50 by weight. If this ratio is too large (i.e., the relative amount of the core polymer particle is too large), the bowl-shaped polymer particle is difficult to prepare.

As specific examples of the acidic group-containing monomer and the monomer copolymerizable therewith, there can be mentioned those which are recited as for the preparation of the nucleus polymer particle. These monomers may be used either alone or as a combination of two or more thereof.

If desired, a minor amount of a cross-linking monomer can be used. As the procedure for polymerization, an emulsion polymerization procedure is usually employed, as the polymerization for the nucleus polymer particle. The polymerization process (batchwise, semi-continuous or continuous), polymerization conditions and auxiliaries may be selected from those which are known, similarly to the case of the preparation of the nucleus polymer particle.

The polymer particle, prepared in step (3) and comprising the intermediate polymer layer substantially surrounding the nucleus/core polymer particle, has a particle diameter in the range of preferably 300 to 900 nm, and more preferably 350 to 800 nm. If the particle diameter is smaller, the opacifying effect and the heat insulating effect are poor. In contrast, if the particle diameter is larger, the polymerization stability becomes poor.

The ratio by weight of the nucleus/core polymer particle to the polymer particle, prepared in step (3) and comprising the intermediate polymer layer substantially surrounding the nucleus/core polymer particle, is usually at least 0.05, preferably at least 0.1 and more preferably at least 0.17. As this weight ratio increases, the bowl-shaped polymer particle becomes easy to prepare.

Preparation of Outer polymer Layer [Step (4)]

The outer polymer layer is formed on the periphery of the intermediate polymer layer formed in step (3), and substantially surrounds the nucleus/core/intermediate layer polymer particle. The outer polymer layer is formed by polymerizing an aromatic vinyl monomer alone or copolymerizing a monomer mixture comprising up to 0.5% by weight of an acidic group-containing monomer and at least 99.5% by weight of an aromatic vinyl monomer copolymerizable therewith in the presence of the polymer particle comprising the intermediate polymer layer, prepared in step (3).

The monomer used for the formation of the outer polymer layer is an aromatic vinyl monomer alone or a monomer mixture comprising at least 99.5% by weight of an aromatic vinyl monomer. Preferably an aromatic vinyl monomer is used alone. If the amount of an aromatic vinyl monomer is smaller than 99.5% by weight, the opacifying effect and heat insulation effect of the bowl-shaped polymer particle become poor.

As specific examples of the aromatic vinyl monomer, there can be mentioned styrene, α-methylstyrene, p-methylstyrene and halogenated styrenes. Of these, styrene is most preferable.

As specific examples of the acidic group-containing monomer to be copolymerized with the aromatic vinyl monomer, there can be mentioned those which are recited as for the preparation of the nucleus polymer particle. If the amount of the acidic group-containing monomer exceeds 0.5% by weight, the bowl-shaped polymer particle becomes to prepare.

The ratio by weight of the polymer particle, prepared in step (3) and comprising the intermediate polymer layer substantially surrounding the nucleus/core polymer particle, to the polymer particle, prepared in step (4) and having the outer polymer layer substantially surrounding the polymer particle prepared in step (3), is preferably in the range of 0.4 to 0.6. If the ratio is smaller than this range, the bowl-shaped polymer particle is difficult to prepare.

The ratio by weight of the nucleus/core polymer particle to the polymer particle, prepared in step (4) and having the outer polymer layer, is usually at least 0.02, preferably at least 0.04 and more preferably at least 0.07. The bowl-shaped polymer particle can be easily made with an increase of this ratio. In contrast, if this ratio is too small, the core polymer has a tendency of shifting to the outside of the outer polymer when polymerization is carried out for formation of the outer polymer layer or at the base-treating step, and thus, void is difficult to occur within the polymer particle at the base-treating step, and the bowl-shaped polymer particle becomes difficult to prepare.

As the polymerization procedure for forming the outer polymer layer, emulsion polymerization is usually employed, which is similar to polymerization for the nucleus polymer particle, the core polymer particle and the intermediate polymer particle. The polymerization process (batchwise, semi-continuous or continuous), polymerization conditions and auxiliaries may be similarly selected from those which are known.

Treatment with Base [Step (5)]

A base is added to an aqueous dispersion, such as a latex, of the polymer particle, prepared in step (4) and having a multi-layer structure comprising the nucleus polymer particle, the core polymer particle, the intermediate polymer layer and the outer polymer layer, to adjust the pH value of the aqueous polymer dispersion to at least 7, whereby a void (i.e., a vacant space) is formed within the polymer particle. At this stage wherein a base is added thereto, the void is filled with an aqueous medium which constitutes the aqueous dispersion of the polymer particle.

As specific examples of the base, there can be mentioned alkali metal hydroxides such as sodium hydroxide, potassium hydroxide and lithium hydroxide; alkaline earth metal hydroxides such as calcium hydroxide and magnesium hydroxide; alkali metal carbonates and bicarbonates such as sodium carbonate and potassium bicarbonate; and ammonium carbonate and ammonium bicarbonate. Of these, alkali metal hydroxides are preferable. The amount of the base is such that at least part of the acid groups within the polymer particle is neutralized whereby the pH value of the aqueous polymer particle dispersion becomes at least 7.

To neutralize the acidic groups within the polymer particle by the addition of a base to the aqueous polymer particle dispersion, a time is required for which a base is diffused inside the polymer particle. Therefore, after the addition of a base, stirring is preferably carried out for a sufficient time. The temperature at which the base treatment is carried out is preferably such that the polymer particle is softened thoroughly. After the addition of a base, the treatment is carried out usually for a period of about 15 to 120 minutes.

It is possible that the stability of the aqueous dispersion is reduced by the addition of a base. To prevent the reduction of stability, an anionic or nonionic surface active agent may be added before the addition of a base. The surface active agent may be used either alone or in combination.

JP-A H3-26724 discloses a process for the preparation of hollow polymer particles including the step of treating with a base in the presence of an organic solvent. In contrast, it is rather preferable in the present invention that the base treatment is carried out in the absence of an organic solvent. If the base treatment is carried out in the presence of an organic solvent, especially a non-polymerizable aliphatic hydrocarbon, the finally produced polymer particles have a flat shape rather than a bowl shape.

The base treatment can be carried out in the presence of a polymerizable monomer. Usually a monomer not containing an acidic group is used. The amount of the polymerizable monomer is usually in the range of 1 to 20 parts by weight, preferably 2 to 10 parts by weight, based on 100 parts by weight of the total monomers used for the production of polymer particles.

Acid Treatment [Step (5')]

The polymer latex, thus-treated with a base, may be treated with an acid to lower the pH value below 7, if desired. By the acid treatment, the particle diameter and the void diameter can be made large.

The acid used for the optional acid-treatment is not particularly limited, and includes, for example, inorganic acids such as hydrochloric acid and sulfuric acid; and organic acids such as acetic acid and malonic acid. An acidic group-containing monomer may also be used as the acid for the acid treatment. The amount of the acidic group-containing monomer is usually in the range of 0.01 to 40 parts by weight, preferably 0.05 to 20 parts by weight and more preferably 0.2 to 10 parts by weight, based on 100 parts by weight of the total monomers used for the preparation of the nucleus/core/intermediate layer/outer layer polymer particles.

In the acid treatment, the acidic group-containing monomer may be used in combination with a monomer copolymerizable therewith. The amount of the copolymerizable monomer is usually in the range of 0.1 to 20 parts by weight, preferably 0.5 to 10 parts by weight, based on 100 parts by weight of the monomer or monomer mixture for the outermost layer. As examples of the copolymerizable monomer, there can be mentioned those which are recited as for the preparation of the core polymer particle.

The temperature, time and other conditions for the acid treatment are approximately the same as those for the base treatment. It is possible that the stability of the aqueous dispersion is reduced by the addition of an acid. If desired, to prevent the reduction of stability, an anionic or nonionic surface active agent may be added prior to the addition of an acid. The surface active agent may be used either alone or in combination.

Formation of Outermost Polymer Layer [Step (6)]

After the base treatment, or the acid treatment, if desired, an aromatic vinyl monomer or a monomer mixture comprising at least 90% by weight of an aromatic vinyl monomer and not larger than 10% by weight of a monomer copolymerizable therewith is added to polymerize the aromatic vinyl monomer or copolymerize the monomer mixture in the presence of the polymer particle with the multi-layer structure, to form an outermost polymer layer surrounding the outer polymer layer of the polymer particle. By the polymerization of an aromatic vinyl monomer or a monomer mixture predominantly comprised of an aromatic vinyl monomer, an outermost polymer layer having a high glass transition temperature (Tg) is formed, and thus, the opacifying effect and heat-insulating effect of the hollow polymer particle are enhanced and melt-adhesion of polymer articles is prevented. As mentioned above, the monomer or monomer mixture for forming the outermost layer may be added to the aqueous polymer particle dispersion in the base treatment step to promote the diffusion of a base within the polymer particle. As the monomer used for copolymerization in combination with an aromatic vinyl monomer, an acidic group-containing monomer is preferably used. The acidic group-containing monomer can be added to the aqueous polymer particle dispersion for the purpose of treating the polymer particle with an acid in the acid treatment step, as explained as for the acid treatment step. When an acidic group-containing monomer is used in combination with an aromatic vinyl monomer, vacant space ratio of the hollow polymer particle is enhanced and the bowl-shaped polymer particle can easily be produced.

If the content of an aromatic vinyl monomer in the monomer mixture for forming the outermost polymer layer is smaller than 90% by weight, the opacifying effect and the heat-insulating effect are reduced and the polymer particles are liable to be melt-adhered.

The ratio by weight of the polymer particle, prepared in step (4) and having the outer polymer layer substantially surrounding the polymer particle prepared in step (3), to the outermost polymer layer is usually in the range of 100/10 to 50/100 and preferably 100/25 to 100/100.

If desired, a minor proportion of a cross-linking monomer may be used as a part of the monomer mixture for forming the outermost polymer layer.

As the polymerization procedure for forming the outermost polymer layer, an emulsion polymerization procedure is usually employed, which is similar to polymerization for the other polymer layers. The polymerization process (batchwise, semi-continuous or continuous), polymerization conditions and auxiliaries may be similarly selected from those which are known.

Drying [Step (7)]

By the formation of the outermost polymer layer, hollow polymer particles having at least one void are obtained. At the stage of completion of polymerization, the void within the hollow polymer particles is filled with the aqueous liquid. When the hollow polymer particles are dried to remove the aqueous liquid, bowl-shaped polymer particles can be obtained.

It is presumed that, with a progress of drying and a removal of the aqueous liquid within the polymer particle, the outer shell forming the hollow polymer particle is caved in an inwardly folded manner whereby the entire polymer particle becomes bowl-shaped. More specifically, with a progress of drying, the degree of caving of the outer shell progresses and the volume of vacant space within the polymer particle is gradually reduced, and finally, the volume of vacant space reaches zero or in the vicinity thereof whereby the entire polymer particle becomes bowl-shaped. The drying can be conducted either by directly drying the aqueous dispersion (i.e., latex), for example, by spray drying, or by coagulating the aqueous dispersion, for example, by a conventional coagulating procedure, to separate the solid hollow polymer particle, followed by drying the separated polymer particle. By drying relatively rapidly, a solid bowl-shaped polymer particle with no vacant space within the particle can be obtained. By the spray-drying, a solid bowl-shaped polymer particle with no vacant space therein can be directly obtained.

III. Use of Bowl-Shaped Polymer Particle, Thermal Recording Material

The bowl-shaped polymer particle of the present invention is used as a heat-insulating material, an organic pigment, an opacifying agent and others, and is incorporated in a heat-insulating intermediate layer-forming material, an aqueous paint, a coating for paper, and others.

A typical example of the use is a material for forming a heat-insulating intermediate layer between a support and a thermal recording layer in a thermal recording material having the thermal recording layer formed on the support. Thus, the thermal recording material comprises a support, a heat-insulating intermediate layer comprising the bowl-shaped polymer particle of the invention, and a thermal recording layer.

The support is generally selected from sheet-form articles such as paper, synthetic paper, nonwoven fabric, and plastic film or sheet, but articles other than sheet-form articles can be used.

To form on a support the heat-insulating intermediate layer comprising the bowl-shaped polymer particle of the invention, the bowl-shaped polymer particle is dispersed in water together with a binder, the thus-prepared aqueous dispersion is coated on a support, and the coating is dried. The coating procedure is not particularly limited, and conventional coating procedures using, for example, an off-machine coating apparatus or an on-machine coating apparatus, provided with a coater such as an air knife coater, a rod blade coater, a billblade coater or a roll coater, can be adopted.

As specific examples of the binder, there can be mentioned polyvinyl alcohol and its derivatives such as partially or completely saponified polyvinyl alcohol, carboxyl-modified polyvinyl alcohol, amide-modified polyvinyl alcohol, sulfonic acid-modified polyvinyl alcohol, butyral-modified polyvinyl alcohol, and other modified polyvinyl alcohols; starch and its derivatives; cellulose derivatives such as methoxycellulose, hydroxyethyl cellulose, carboxymethyl cellulose, methyl cellulose, and ethyl cellulose; water-soluble polymeric materials such as sodium polyacrylate, polyvinyl pyrrolidone, acrylamide/acrylic acid ester copolymers, acrylamide/acrylic acid ester/methacrylic acid terpolymers, an alkali metal salt of styrene/maleic anhydride copolymer, an alkali metal salt of isobutylene/maleic anhydride copolymer, polyacrylamide, sodium alginate, gelatine and casein; latexes of polymers such as acrylonitrile/butadiene copolymer, styrene/butadiene copolymer, and styrene/butadiene/acrylate copolymer; and aqueous emulsions of polymeric materials such as vinyl chloride resin, vinyl acetate resin, vinyl acetate/acrylic acid copolymer, styrene/acrylic acid ester copolymer, acrylic acid ester resin, polyvinyl butyral, polyamide resin, and polyurethane resin.

The amount of the bowl-shaped polymer particle in the coating for forming the intermediate lever is in the range of 5 to 95% by weight, preferably 60 to 85% by weight, based on the total solid content of the polymer particle and the binder. The amount of the binder in the coating for forming the intermediate layer is in the range of 95 to 5% by weight, preferably 40 to 15% by weight, based on the total solid content of the polymer particle and the binder. The amount of the coating liquid applied onto the support is in the range of 1 to 30 g/m$^2$, preferably 3 to 20 g/cm$^2$, as expressed as the amount of the bowl-shaped polymer particle.

If desired, auxiliaries conventionally added to thermal recording material can be incorporated together with the bowl-shaped polymer particle and the binder. The auxiliaries include, for example, fillers, dispersants, defoaming agents, fluorescent dyes, coloring dyes, inorganic pigments, organic pigments, wax and other lubricants, ultraviolet absorbers such as benzophenone-type and triazole-type ultraviolet absorbers, sensitizer, and electrically conductive substances.

If desired, an additional layer comprising a pigment and other auxiliaries, and a binder, can be formed, in addition to the intermediate layer comprising the bowl-shaped polymer particle, between the intermediate layer and the support, and/or between the intermediate layer and the thermal recording layer.

As the pigment, known organic and inorganic pigments can be used. As specific examples of the inorganic pigment, there can be mentioned alumina, magnesium hydroxide, calcium hydroxide, magnesium carbonate, zinc oxide, barium sulfate, silica, calcium carbonate, kaoline, calcined kaoline, diatomaceous earth, talc, titanium oxide and aluminum hydroxide. As specific examples of the organic pigment, there can be mentioned urea-formaldehyde resin, styrene/methacrylic acid copolymer, polystyrene resin, and amino resin filler. Of these, those which have an oil absorption of about 30 to 200 cc/100 g is preferable.

When a thermal recording layer is formed on the intermediate layer, if desired, calendering can be conducted on the intermediate layer to render the surface smooth, and then, a coating for forming the thermal recording layer is applied onto the smooth intermediate layer.

The thermal recording layer comprises a combination of a color producing reagent with a developer. The combination of a color producing reagent with a developer is not particularly limited, provided that, when the color producing reagent and the developer are heated and placed in contact with each other, a color reaction occurs. The combination of a color producing reagent with a developer includes, for example, leuco dye-type color developing material comprising a combination of a colorless or light-colored basic dye with an inorganic or organic acidic substance, a chelate-type color developing material comprising a combination of a metal salt of a higher fatty acid such as ferric stearate with stearyl gallate, a pigment-type color developing material comprising an imino compound with an isocyanate compound, and a color developing material comprising a diazonium compound, coupler and a basic substance. Of these, color developing materials, leuco dye-type color developing material comprising a combination of a colorless or light-colored basic dye with and acidic substance is preferable.

As specific examples of the colorless or light-colored basic dye, there can be mentioned triphenylmethane-type leuco dyes such as 3,3-bis(p-dimethylaminophenyl)-6-dimethylamino-pthalide; fluoran-type leuco dyes such as 3-diethylamino-6-methyl-7-anilinofluoran, 3-(N-ethyl-p-toluidino)-6-methyl-7-anilinofluoran, 3-(N-ethyl-p-isoamylamino)-6-methyl-7-anilinofluoran, 3-diethylamino-6-methyl-7-(o,p-dimethylanilino)fluoran, 3-pyrrolidino-6-methyl-7-anilinofluoran, 3-piperidino-6-methyl-7-anilinofluoran, 3-(N-cyclohexyl)-N-methylamino)-6-methyl-7-anilinofluoran, 3-diethylamino-7-(m-trifluoromethylanilino)fluoran, 3-N-n-dibutylamino-6-methyl-7-anilinofluoran, 3-N-n-dibutylamino-7-(o-chloroanilino)fluoran, 3-(N-ethyl-N-tetrahydrofurfurylamino)-6-methyl-7-anilinofluoran, 3-dibutylamino-6-methyl-7-(o,p-dimethylanilino)fluoran, 3-(N-methyl-N-propylamino-6-methyl-7-anilinofluoran, 3-diethylamino-6-chloro-7-anilinofluoran, 3-dibutylamino-7-(o-chloroanilino)fluoran, 3-diethylamino-7-(o-chloroanilino)fluoran, 3-diethylamino-6-methyl-7-(m-methylanilino)fluoran, 3-n-dibutylamino-6-methyl-7-(m-methylanilino)fluoran, 3-diethylamino-6-methyl-chlorofluoran, 3-diethylamino-6-methyl-fluoran, 3-cyclohexyl-amino-6-chlorofluoran, 3-diethylamino-benzo[a]-fluoran, 3-n-dipentylamino-6-methyl-7-anilinofluoran, 2-(4-oxo-hexyl-3-dimethylamino-6-methyl-7-anilinofluoran, 2-(4-oxo-hexyl-3-diethylamino-6-methyl-7-anilinofluoran, 2-(4-oxo-hexyl-3-dipropylamino-6-methyl-7-anilinofluoran, 2-methyl-6-p-(p-dimethylaminophenyl) aminoanilinofluoran, 2-chloro-3-methyl-6-p-(p-phenylaminophenyl)aminoanilinofluoran, 2-methoxy-6-p-(p-dimethylaminophenyl)aminoanilinofluoran, 2-chloro-6-p-(p-dimethylaminophenyl)aminoanilinofluoran, 2-nitro-6-p-(p-diethylaminophenyl)aminoanilinofluoran, 2-amino-6-p-(p-diethylaminophenyl)aminoanilinofluoran, 2-diethylamino-6-p-(p-diethylaminophenyl) aminoanilinofluoran, 2-phenyl-6methyl-6-p-(p-phenylaminophenyl)aminoanilinofluoran, 2benzyl-6-p-(p-phenylaminophenyl)aminoanilinofluoran, 2-hydroxy-6-p-(p-phenylaminophenyl)aminoanilinofluoran, 3-methyl-6-p-(p-dimethylaminophenyl)aminoanilinofluoran, 3-diethylamino-6-p-(p-diethylaminophenyl) aminoanilinofluoran and 3-diethylamino-6-p-(p-dibutylaminophenyl)aminoanilinofluoran; fluorene-type leuco dyes such as 3,6,6'-tris(dimethylamino)spiro[fluorene-9,3'-phthalide] and 3,6,6'-tris(diethylamino)spiro[fluorene-9,3'-phthalide]; divinyl-type leuco dyes such as 3,3-bis-[2-(p-dimethylaminophenyl)-2-(p-methyoxyphenyl)ethenyl]-4,5,6,7-tetrabromophthalide, 3,3-bis-[2-(p-dimethylaminophenyl)-2-(p-methoxyphenyl)-ethenyl]-4,5,6,7-tetrachlorophthalide, 3,3-bis-[1,1-bis(4-pyrrolidinophenyl)-ethylen-2-yl]-4,5,6,7-tetrabromo-phthalide and 3,3-bis-[1-(4-methoxyphenyl)-1-(4-pyrrodinophenyl)ethylen-2-yl]-4,5,6,7-tetrachlorophthalide; and 1,1-bis-[2',2',2",2"-tetrakis-(p-dimethylaminophenyl)-ethenyl]-2,2-dinitriloethane, 1,1-bis-[-2',2',2",2"-tetrakis-(p-dimethylaminophenyl)-ethenyl]-2-β-naphthoylethane, 1,1-bis-[2',2',2",2"-tetrakis-(p-dimethylaminophenyl)-ethenyl]-2,2-diacetylethane and bis-[2,2,2',2'-tetrakis-(p-dimethylaminophenyl)-ethenyl]-methylmalonic acid dimethyl ester. These dyes may be used either alone or as a mixture of at least two thereof.

As specific examples of the developer used in combination with the above-recited leuco dyes, there can be mentioned bisphenols A such as 4,4'-isopropyridenediphenol (i.e., bisphenol A), 4,4'-cyclohexylidenediphenol, p,p'-(1-methylnormalhexylidene)diphenol and 1,7-di (hydroxyphenylthio)-3,5-dioxaheptane; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate and methylbenzyl 4-hydroxybenzoate; 4-hydroxyphthalic acid diesters such as dimethyl 4-hydroxyphthalate, diisopropyl 4-hydroxyphthalate, dibenzyl 4-hydroxyphthalate and dihexyl 4-hydroxyphthalate; phthalic acid monoesters such as monobenzyl phthalate, monocyclohexyl phthalate, monophenyl phthalate, monomethylphenyl phthalate, monoethylphenyl phthalate, monopropylbenzyl phthalate, monohalogenobenzyl phthalate and monoethoxybenzyl phthalate; bis-(hydroxyphenyl)sulfides such as bis-(4-hydroxy-3-tert-butyl-6-methylphenyl)sulfide, bis-(4-hydroxy-2,5-dimethylphenyl)sulfide, bis-(4-hydroxy-2-methyl-5-ethylphenyl)sulfide, bis-(4-hydroxy-2-methyl-5-isopropylphenyl)sulfide, bis-(4-hydroxy-2,3-dimethylphenyl)sulfide, bis-(4-hydroxy-2,5-dimethylphenyl)sulfide, bis-(4-hydroxy-2,5-diisopropylphenyl)sulfide, bis-(4-hydroxy-2,3,6-trimethylphenyl)sulfide, bis-(2,4,5-trihydroxyphenyl) sulfide, bis-(4-hydroxy-2cyclohexyl-5-methylphenyl) sulfide, bis-(2,3,4-trihydroxyphenyl)sulfide, bis-(4,5-dihydroxy-2-tert-butylphenyl)sulfide and bis-(4-hydroxy-2-tert-octyl-5-methylphenyl)sulfide; 4-hydroxyphenyl aryl sulfones such as 4-hydroxy-4'-iospropoxydiphenyl sulfone, 4-hydroxy-4'-propoxydiphenyl sulfone, 4-hydroxy-4'-n-butyloxydiphenyl sulfone and 4-hydroxy-4'-n-propoxydiphenyl sulfone; 4-hydroxyphenylaryl sulfonates such as 4-hydroxyphenylbenzene sulfonate, 4-hydroxyphenyl-p-tolyl sulfonate, 4-hydroxyphenylmethylene sulfonate, 4-hydroxyphenyl-p-chlorobenzene sulfonate, 4-hydroxyphenyl-p-tert-butylbenzene sulfonate, 4-hydroxyphenyl-p-isopropoxybenzene sulfonate, 4-hydroxyphenyl-1'-naphthalene sulfonate and 4-hydroxyphenyl-2'-naphthalene sulfonate; 1,3-di[2-hydroxyphenyl)-2-propyl]-benzenes such as 1,3-di[2-(4-hydroxyphenyl)-2-propyl]-benzene, 1,3- di[2-(4-hydroxy)-3-alkylphenyl)-2-propyl]-benzene, 1,3-di[2-(2,4-dihydroxyphenyl)-2-propyl]-benzene and 1,3-di[2-(2-hydroxy-5-methylphenyl)-2-propyl]-benzene; resorcinols such as 1,3-dihydroxy-6-(α,α-dimethylbenzyl)-benzene; 4-hydroxybenzoyloxybenzoic acid esters such as benzyl 4-hydroxybenzoyloxybenzoate, methyl 4-hydroxybenzoyloxybenzoate, ethyl 4-hydroxybenzoyloxybenzoate, propyl 4-hydroxybenzoyloxybenzoate, butyl 4-hydroxybenzoyloxybenzoate, isopropyl 4-hydroxybenzoyloxybenzoate, tert-butyl 4-hydroxybenzoyloxybenzoate, hexyl 4-hydroxybenzoyloxybenzoate, octyl 4-hydroxybenzoyloxybenzoate, nonyl 4-hydroxybenzoyloxybenzoate, cyclohexyl 4-hydroxybenzoyloxybenzoate, β-phenethyl 4-hydroxybenzoyloxybenzoate, phenyl 4-hydroxybenzoyloxybenzoate, α-naphthyl 4-hydroxybenzoyloxybenzoate, β-naphthyl 4-hydroxybenzoyloxybenzoate and sec-butyl 4-hydroxybenzoyloxybenzoate; bisphenol sulfones such as bis-(3-1-butyl-4-hydroxy-6-methylphenyl) sulfone, bis-(3-ethyl-4-hydroxyphenyl) sulfone, bis-(3-propyl-4-hydroxyphenyl) sulfone, bis-(3-methyl-4-hydroxyphenyl) sulfone, bis-(2-isopropyl-4-hydroxyphenyl) sulfone, bis-(2-ethyl-4-hydroxyphenyl) sulfone, bis-(3-chloro-4-hydroxyphenyl) sulfone, bis-(2,3-dimethyl-4-hydroxyphenyl) sulfone, bis-(2,5-dimethyl-4-hydroxyphenyl) sulfone, bis-(3-methoxy-4-hydroxyphenyl) sulfone, 4-hydroxyphenyl)-2'-ethyl-4'-hydroxyphenyl sulfone, 4-hydroxyphenyl)-2'-isopropyl-4'-hydroxyphenyl sulfone, 4-hydroxyphenyl)-3'-isopropyl-4'-hydroxyphenyl sulfone, 4-hydroxyphenyl)-3'-sec-butyl-4'-hydroxyphenyl sulfone, 3-chloro-4-hydroxyphenyl-3'-isopropyl-4'-hydroxyphenyl sulfone, 2-hydroxy-5-tert-butylphenyl-4'-hydroxyphenyl sulfone, 2-hydroxy-5-tert-amylphenyl-4'-hydroxyphenyl sulfone, 2-hydroxy-5-isopropylphenyl-4'-hydroxyphenyl sulfone, 2-hydroxy-5-tert-octylphenyl-4'-hydroxyphenyl sulfone, 2-hydroxy-5-tert-butylphenyl-3'-chloro-4'-hydroxyphenyl sulfone, 2-hydroxy-5-tert-butylphenyl-3'-methyl-4'-hydroxyphenyl sulfone, 2-hydroxy-5-tert-butylphenyl-3'-isopropyl-4'-hydroxyphenyl sulfone, 2-hydroxy-5-tert-butylphenyl-2'-methyl-4'-hydroxyphenyl sulfone, 4,4'-sulfonyldiphenol, 2,4'-sulfonyldiphenol, 3,3'-dichloro-4,4'-sulfonyldiphenol, 3,3'-dibromo-4,4'-sulfonyldiphenol, 3,3',5,5'-tetrabromo-4,4'-sulfonyldiphenol and 3,3'-diamino-4,4'-sulfonyldiphenol; and 4,4'-bis(p-toluenesulfonylaminocarbonylamino)-diphenylmethane, p-tert-butylphenol, 2,4-dihydroxy-benzophenone, novolak-type phenol-formaldehyde resin, 4-hydroxyacetophenone, p-phenylphenol, benzyl-4-hydroxyphenyl acetate and p-benzyl phenol.

The ratio of the color producing basic dye to the developer is in the range of 1/1 to 1/8 by weight.

A binder is incorporated in a coating color for forming the thermal recording layer. The amount of the binder is usually in the range of 5 to 40% by weight, preferably 10 to 25% by weight, based on the total solid content in the coating color. As the binder, water-soluble high polymers or aqueous high polymer emulsions are used in a manner similar to that in the binder for the intermediate layer. As specific examples of the binder, there can be mentioned those which recited as for the binder for the intermediate layer.

The thermal recording layer may have incorporated therein a known sensitizer provided that the object of the present invention is attained. As specific examples of the sensitizer, there can be mentioned fatty acid amides such as stearic acid amide and palmitic acid amide, ethylene bisamide, montan wax, polyethylene wax, dibenzyl terephthalate, benzyl p-benzyloxy-benzoate, di-p-tolyl carbonate, p-benzylbiphenyl, phenyl α-naphthylcarbonate, 1,4-diethoxynaphthalene, phenyl 1-hydroxy-2-naphthoate, 1,2-di-(3-methlphenoxy)ethane, di(p-methyl-benzyl) oxalate, β-benzyloxynaphthalene, 4-biphenyl p-tolyl ether, o-xylylene-bis-(phenylether) and 4-(m-methylphenoxy-methyl)biphenyl. These sensitizers may be used either alone or as a mixture of at least two thereof.

The thermal recording layer may have incorporated therein a stabilizer such as p-nitrobenzoic acid metal salt or phthalic acid monobenzyl ester metal salt, a pigment and a filler. As examples of the pigment and the filler, there can be mentioned those which are recited as for the intermediate layer. Further, a release agent such as a fatty acid metal salt, a lubricant such as wax, an ultraviolet absorber such as a benzophenone- or triazole-type ultraviolet absorber, a water resistance-imparting agent such as glyoxal, a dispersant and a defoaming agent may also be incorporated.

The coating liquid for the thermal recording layer can be applied by a known procedure in a manner similar to that in the coating liquid for the intermediate layer.

If desired, to enhance the useful life of the thermal recording material, an overcoating layer comprising a high polymeric material having incorporated a pigment therein can be formed on the thermal recording layer, or a back coating layer comprising a high polymeric material can be formed on the support.

The bowl-shaped polymer particle and its application for a thermal recording material will now be specifically described by the following examples.

In the following examples, parts and % are by weight unless otherwise specified. The amount of latex was expressed in terms of the weight of solid content.

EXAMPLE 1

Production of Bowl-Shaped Particle (1)

An emulsion (i) was prepared by mixing under agitation 1 part of a monomer mixture (a) for preparing a nucleus polymer particle comprising 60% of methyl methacrylate (MMA), 5% of butyl acrylate (BA) and 35% of methacrylic acid (MAA), 0.005 part of an emulsifier (DBS) and 0.8 part of deionized water.

An emulsion (ii) was prepared by mixing under agitation 10 parts of a monomer mixture (b) for preparing a core polymer particle comprising 70% of MMA, 10% of BA and 20% of MAA, 0.05 part of an emulsifier (DBS) and 8 parts of deionized water.

An emulsion (iii) was prepared by mixing under agitation 25 parts of a monomer mixture (c) for forming an intermediate polymer layer comprising 78% of MMA, 16% of BA and 6% of MAA, 0.1 part of an emulsifier (DBS) and 35 parts of deionized water.

An emulsion (iv) for forming an outer polymer layer was prepared by mixing under agitation 36.9 parts of styrene (ST), 0.3 part of an emulsifier (DBS) and 16 parts of deionized water.

An emulsion (v) was prepared by mixing under agitation 38.1 parts of a monomer mixture (d) for forming an outermost polymer layer comprising 96.9% of styrene (ST) and 3.1% of MAA, 0.3 part of an emulsifier (DBS) and 16 parts of deionized water.

A reactor equipped with a stirrer, a reflux condenser, a thermometer and a dropping funnel was charged with 2.8 parts of deionized water, and 0.04 part (as solid content) of an acrylic polymer seed latex having a particle diameter of 35 nm and a solid content of 12%, and the content was heated to 80° C. Then 0.17 part of a 3% aqueous potassium persulfate (KPS) solution was added through the dropping funnel, and then, the emulsion (i) was continuously added over a period of 4 hours, and the added monomers were was further subjected to polymerization for 1 hour to prepare a nucleus polymer emulsion. The conversion of the monomer mixture (a) was 99%.

Then 28 parts of deionized water and 1.7 parts of a 3% aqueous KPS solution were added, and the emulsion (ii) was continuously added over a period of 3 hours. After completion of the addition, the added monomers were further subjected to polymerization for 2 hours to prepare a core polymer. The conversion of the monomer mixture (b) was 99%.

Then 240 parts of deionized water and 6.7 parts of a 3% aqueous KPS solution were added, and the emulsion (iii) was continuously added over a period of 4 hours. After completion of addition, the added monomers were further subjected to polymerization for 2 hours to form an intermediate polymer layer. The conversion of the monomer mixture (c) was 99%.

The content was heated to 85° C., and 6.7 parts of a 3% aqueous KPS solution were added, and the emulsion (iv) was continuously added over a period of 1.5 hours. After completion of the addition, the added monomers were further subjected to polymerization for 1 hour to form an outer polymer layer. The conversion of the monomer mixture (d) was 99%.

To the thus-prepared polymer latex, 9 parts of a 10% aqueous sodium hydroxide solution were dropwise added through the dropping funnel, and then, the content was maintained at 85° C. for 30 minutes, to conduct a base treatment. A portion of the content was sampled, and the pH value as measured at room temperature was 8.7.

Then 10 parts of a 3% aqueous KPS solution were added, and then the emulsion (v) was continuously added over a period of 1.5 hours. After completion of the addition, the added monomers were subjected to polymerization for 2 hours to prepare a latex containing polymer particles having the thus-formed outermost polymer layer. The conversion of the monomer mixture (d) was 99%.

The polymer particle-containing latex was dried by a spray drier having an inlet temperature of 160° C. and an outlet temperature of 60° C. to prepare polymer particle.

Figure 2:
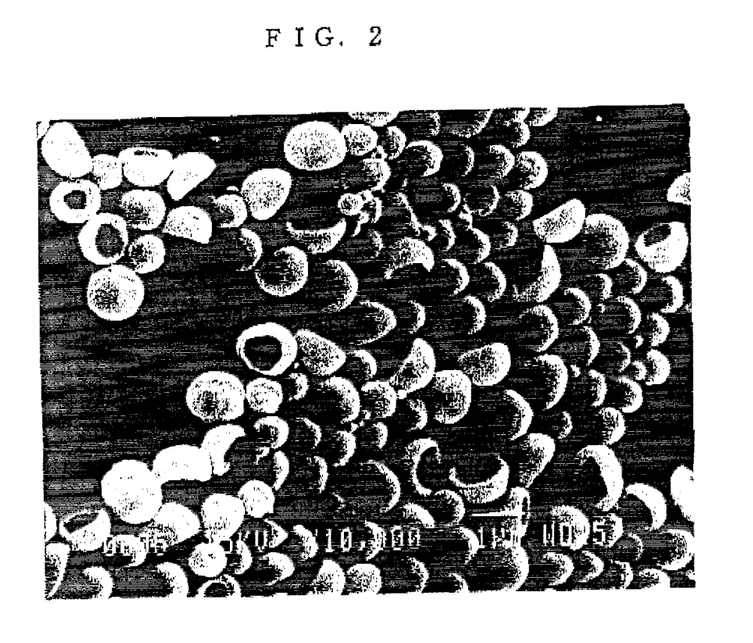
FIG. 2 is a scanning electron microscope (SEM) photograph of a bowl-shaped polymer particle obtained in Example 1.

A scanning electron micrograph (SEM) photograph of the polymer particles is shown in FIG. 2. Observation of the appearance of the polymer particles by SEM revealed that the polymer particles were bowl-shaped particles such that a part of each spherical particle having an average maximum diameter 890 nm was concave to form a brim having an average diameter of 690 nm.

EXAMPLE 2

Production of Bowl-Shaped Particle (2)

Polymer particles were produced by the same procedure as that in Example 1 except that the amount of the acrylic polymer see latex was changed to 0.0048 part, the amount of the monomer mixture (a) for preparing a nucleus polymer particle was changed to 0.12 part, and, as the monomer mixture (b) for preparing a core polymer particle, 3 parts of a monomer mixture comprising 60% of MMA, 10% of BA and 30% of MMA were used. Observation of the appearance of the polymer particles revealed that the thus-obtained polymer particles were bowl-shaped particles such that a part of each spherical particle having an average maximum diameter 1,390 nm was concave to form a brim having an average diameter of 1,100 nm.

EXAMPLE 3

Production and Evaluation of Thermal Recording Material

An intermediate layer-forming coating liquid A was prepared by dispersing the following ingredients.

| Liquid A: | |
|---|---|
| Bowl-shaped polymer particle (A), prepared in Example 1 | 100 parts |
| Styrene/butadiene copolymer latex (solid content: 48%) | 11 parts |
| 10% Aqueous polyvinyl alcohol solution | 5 parts |
| Water | 150 parts |

Woodfree paper having a basis weight of 50 g/m$^2$ was coated with liquid A in an amount of 8 g/m$^2$ (dry weight) and dried to prepare an intermediate layer-formed paper.

According to the following recipes, liquid B, liquid C and liquid D were prepared by pulverizing the respective solid ingredients into an average particle diameter of not larger than 1 μm by a sand grinder, followed by dispersing in water.

| Liquid B: (Developer dispersion): | |
|---|---|
| 4.4'-Isopropylidenediphenol | 6.0 parts |
| 10% Aqueous polyvinyl alcohol solution | 18.8 parts |
| water | 11.2 parts |
| Liquid C (Dyestuff dispersion): | |
| 3-N-n-Dibutylamino-6-methyl-7-anilinofluoran | 2.0 parts |
| 10% Aqueous polyvinyl alcohol solution | 4.6 parts |
| Water | 2.6 parts |
| Liquid D (Sensitizer dispersion): | |
| 4-Biphenyl-p-tolylether | 4.0 parts |
| 10% Aqueous polyvinyl alcohol solution | 5.0 parts |
| Water | 3.0 parts |

Liquid B, liquid C and liquid D were mixed together with an aqueous kaoline clay dispersion according to the following recipe to prepare a coating solution.

| Liquid B | 36.0 parts |
|---|---|
| Liquid C | 9.2 parts |
| Liquid D | 12.0 parts |
| Kaoline clay dispersion (50% aqueous dispersion) | 12.0 parts |

The thus-prepared coating color was coating in an amount of 6.0 g/m$^2$ on the above-mentioned intermediate layer-formed wood-free paper. The coated paper was dried and subjected to calendering to a smoothness degree of 700–800 sec by using a super-calendar to obtain a thermal recording sheet.

Dynamic coloring sensitivity, reproducibility of dots and deposition of tailings on thermal head were evaluated on the thermal recording sheet by the following methods.

Dynamic Coloring Density

An image was reproduced by using a thermal facsimile UF-1000B supplied by Matsushita Denso K.K. at a voltage of 14.7 V, a resistance of 360 Ω, a pulse width of 0.82 ms and an imposed energy 0.37 mJ/dot. The image density was measured by using a Macbeth densitometer (RD-914, using amber filter).

Reproducibility of dots

Printed dots of the dynamically recorded image were observed by the naked eye, and the evaluation results were expressed according to the following ratings.
A: Good
B: Slightly poor Deposition of Tailings Copying was conducted on 20 sheets with B4 size having lengthwise stripes by using a thermal facsimile UF-60, supplied by Matsushita Denso K.K., at a copy-mode, and deposition of tailings on the thermal head was observed by the naked eye. The Evaluation results were expressed according to the following ratings.
A: Very good
B: Good
C: Slightly poor The evaluation results are shown in Table 2.

EXAMPLE 4, COMPARATIVE EXAMPLES 1–5

By the same procedure as in Example 3, thermal recording sheets were made except that latex (B) of bowl-shaped polymer particles (Example 4), and the polymer particles shown in Table 1 (Comparative Examples 1–5) were used instead of the latex (A) of bowl-shaped polymer particles, and the thermal recording sheets were evaluated. The evaluation results are shown in Table 2.

TABLE 1

| Example No. | Polymer particles |
|---|---|
| Example 4 | Bowl-shaped polymer particles in latex (B) prepared in Example 2 |
| Comp. Ex. 1 | Hollow spherical fine particles of styrene/acrylate copolymer resin (average particle diameter: about 0.5 μm, vacant space ratio: 55%, supplied by Nippon Zeon Co.) |
| Comp. Ex. 2 | Hollow non-spherical fine particles of styrene/acrylate copolymer resin (average particle diameter: about 1.5 μm, vacant space ratio: 18%) |
| Comp. Ex. 3 | Hollow spherical fine particles of polyvinylidene chloride resin (average particle diameter: about 8 μm, "Microsphere F-30", degassed, supplied by Matsumoto Yushi Seiyaku. K. K.) |
| Comp. Ex. 4 | Hollow spherical fine particles of aluminosilicate (average particle diameter: about 20 μm, Filite, supplied by Nippon Filite K. K.) |
| Comp. Ex. 5 | Flat-shaped polymer particles prepared by the method described in JP-A-H2-14222, Example 1 |

TABLE 2

| Example No. | Dynamic coloring density | Reproducibility of dots | Deposition of tailings |
|---|---|---|---|
| Example 3 | 1.08 | A | A |
| Example 4 | 1.13 | A | A |
| Comp. Ex. 1 | 0.91 | B | B |
| Comp. Ex. 2 | 0.89 | B | B |
| Comp. Ex. 3 | 0.84 | B | C |
| Comp. Ex. 4 | 0.83 | B | C |
| Comp. Ex. 5 | 0.88 | B | C |

INDUSTRIAL APPLICABILITY

The bowl-shaped polymer particles of the present invention has properties advantageous for a heat insulating material, an organic pigment, an opacifyinbg agent and others. Therefore, the polymer particles are useful as ingredients to be incorporated in, for example, materials for forming a heat-insulating intermediate layer of a thermal recording material, an aqueous coating composition, and a coating color for paper.

Especially, an intermediate layer comprising the bowl-shaped polymer particles, formed between a thermal recording layer and a support of a thermal recording material, exhibits good heat-insulating property. Therefore, utilization of heat energy of a thermal head and other elements is improved and coloring sensitivity of a thermal recording layer is enhanced. The bowl-shaped polymer particles exhibit an appropriate elasticity in the intermediate layer, and thus, reproducibility of printed dots is enhanced. Further, a problem of deposition of tailings on a thermal head and sticking can be minimized in the thermal recording material.

What is claimed is:

1. Bowl-shaped polymer particles characterized by having a bowl-like shape as is formed by partly outting along a plane each spherical hollow polymer particle having a void in the inside, and in which the cross-section perpendicular to the cut plane and passing through the center of the particle has a shape as is formed by partly cutting a double circle along a straight line, and the lengths H of the perpendiculars from the outer arc of the double circle in the cross-section to the straight line have a maximum value $H_{max}$ equal to or larger than the radius of the outer circle of the double circle.

2. The bowl-shaped polymer particles according to claim 1, which have an average maximum diameter in the range of 0.3 to 5 μm.

3. The bowl-shaped polymer particles according to claim 1, wherein the ratio of the average outer diameter of the circular brim of the bowl to the average maximum diameter of the polymer particles is in the range of 25 to 100%.

4. The bowl-shaped polymer particles according to claim 1, wherein the ration of the radial thickness of the circular brim of the bowl is in the range of 10 to 30% of the average maximum diameter of the particles.

5. A process for producing bowl-shaped polymer particles, characterized by comprising the steps of:

(1) copolymerizing a monomer mixture comprising 30 to 65% by weight of an acidic group-containing monomer and 70 to 35% by weight of a monomer copolymerizable therewith to prepare a nucleus polymer particle;

(2) copolymerizing a monomer mixture comprising 10 to 35% by weight of an acidic group-containing monomer and 90 to 65% by weight of a monomer copolymerizable therewith in the presence of the nuclear polymer particle to prepare a core polymer particle substantially surrounding the nucleus polymer particle, wherein the content of the acidic group-containing monomer units in the core polymer particle is equal to or smaller than the content of the acid group-containing monomer units in the nucleus polymer particle;

(3) copolymerizing a monomer mixture comprising 1 to 12% by weight of an acidic group-containing monomer and 99 to 88% by weight of a monomer copolymerizable therewith in the presence of the nucleus/core polymer particle to form at least one intermediate polymer layer which substantially surrounds the nucleus/core polymer particle;

(4) polymerizing an aromatic vinyl monomer alone or copolymerizing a monomer mixture comprising up to 0.5% by weight of an acidic group-containing monomer and at least 99.5% by weight of an aromatic vinyl monomer copolymerizable therewith in the presence of the polymer particle which is prepared in step (3) and comprising the intermediate polymer layer substantially surrounding the nucleus/core polymer particle, to prepare an outer polymer layer which substantially surrounds the polymer particle prepared in step (3);

(5) adding a base to an aqueous dispersion of the polymer particle which is prepared in step (4) and has a multi-layer structure comprising at least four layers, to adjust the pH value of the aqueous polymer dispersion to at least 7;

(6) adding an aromatic vinyl monomer or a monomer mixture comprising at least 90% by weight of an aromatic vinyl monomer and not larger than 10% by weight of a monomer copolymerizable copolymerize the monomer mixture in the presence of the polymer particle with the multi-layer structure, prepared in step (5), to form an outermost polymer layer surrounding the outer polymer layer prepared in step (4); and then, (7) drying the thus-prepared aqueous polymer dispersion.

6. The process for producing bowl-shaped polymer particles according to claim 5 wherein, in step (1), a monomer mixture comprising 30 to 55% by weight of an acidic group-containing monomer and 70 to 45% by weight of a monomer copolymerizable therewith is copolymerized to prepare a nucleus polymer particle.

7. The process for producing bowl-shaped polymer particles according to claim 5 wherein, in step (2), a monomer mixture comprising 15 to 35% by weight of an acidic group-containing monomer and 85 to 65% by weight of a monomer copolymerizable therewith is copolymerized in the presence of the nucleus polymer particle to prepare a core polymer particle substantially surrounding the nucleus polymer particle.

8. The process for producing bowl-shaped polymer particles according to claim 5 wherein, in step (2), the monomer mixture for forming the core polymer particle is used in an amount such that the amount of the nucleus polymer particle is in the range of 1 to 25 parts by weight based on 100 parts by weight of the core polymer particle.

9. The process for producing bowl-shaped polymer particles according to claim 5 wherein the nucleus/core polymer particle prepared in step (2) has a particle diameter in the range of 150 to 500 nm.

10. The process for producing bowl-shaped polymer particles according to claim 5 wherein, in step (3), a monomer mixture comprising 2 to 10% by weight of an acidic group-containing monomer and 98 to 90% by weight of a monomer copolymerizable therewith is copolymerized in the presence of the nucleus/core polymer particle to form at least on intermediate polymer layer which substantially surrounds the nucleus/core polymer particle.

11. The process for producing bowl-shaped polymer particles according to claim 5 wherein, in step (3), the monomer mixture for forming the intermediate polymer layer is used in an amount such that the ratio of the core polymer particle to the intermediate polymer layer is in the range of 5/95 to 60/40 by weight.

12. The process for producing bowl-shaped polymer particles according to claim 5, wherein the polymer particle, prepared in step (3) and composed of the intermediate polymer layer substantially surrounding the nucleus/core polymer polymer particle, has a particle diameter in the range of 300 to 900 nm; and the ratio by weight of the nucleus/core polymer particle to the polymer particle, prepared in step (3) and composed of the intermediate polymer layer substantially surrounding the nucleus/core polymer particle, is at least 0.05.

13. The process for producing bowl-shaped polymer particles according to claim 5 wherein, in step (4), the monomer or monomer mixture for preparing the outer polymer layer is used in an amount such that the ratio by weight of the polymer particle, prepared in step (3) and composed of the intermediate polymer layer substantially surrounding the nucleus/core polymer particle, to the polymer particle, prepared in step (4) and having the outer polymer layer substantially surrounding the polymer particle prepared in step (3) is in the range of 0.4 to 0.6; and that the ratio by weight of the nucleus/core polymer particle to the polymer particle, prepared in step (4) and having the outer polymer layer is at least 0.02.

14. The process for producing bowl-shaped polymer particles according to claim 5 wherein, in step (5), an alkali metal hydroxide is added as a base to the aqueous dispersion of the polymer particle, prepared in step (4) and having a multi-layer structure comprising at least four layers, to adjust the pH value of the aqueous polymer dispersion to at least 7.

15. The process for producing bowl-shaped polymer particles according to claim 5 wherein, after step (5), 0.01 to 40 parts by weight, based on 100 parts by weight of the sum of the monomers used in steps (1) to (4), of an acidic group-containing monomer is added to the base-added aqueous dispersion of the polymer particle to lower the pH value thereof below 7.

16. The process for producing bowl-shaped polymer particles according to claim 5 wherein, in step (6), the monomer or monomer mixture for preparing the outermost polymer layer is used in an amount such that the ratio by weight of the polymer particle, prepared in step (4) and having the outer polymer layer substantially surrounding the polymer particle prepared in step (3), to the outermost polymer layer is in the range of 100/10 to 50/100.

17. The process for producing bowl-shaped polymer particles according to claim 5, wherein the acidic group-containing monomer used in steps (1), (2), (3) and (4) is selected from monocarboxylic acids and monoesters of dicarboxylic acids.

18. The process for producing bowl-shaped polymer particles according to claim 5, wherein the aromatic vinyl monomer used in steps (4) and (6) is styrene.

19. The process for producing bowl-shaped polymer particles according to claim 5 wherein, in the drying step (7), the aqueous polymer dispersion is subjected to spray drying.

20. An aqueous dispersion of polymer particles, which is capable of, when the aqueous dispersion is dried, producing the bowl-shaped polymer particles as claim in claim 1.

21. A process for preparing the aqueous polymer particle dispersion capable of producing the bowl-shaped polymer particles, as claimed in claim 20, which is characterized by comprising the steps of:

(1) copolymerizing a monomer mixture comprising 30 to 65% by weight of an acidic group-containing monomer and 70 to 35% by weight of a monomer copolymerizable therewith to prepare a nucleus polymer particle;

(2) copolymerizing a monomer mixture comprising 10 to 35% by weight of an acidic group-containing monomer and 90 to 65% by weight of a monomer copolymerizable therewith in the presence of the nuclear polymer particle to prepare a core polymer particle substantially surrounding the nucleus polymer particle, wherein the content of the acidic group-containing monomer units in the core polymer particle is equal to or smaller than the content of the acid group-containing monomer units in the nucleus polymer particle;

(3) copolymerizing a monomer mixture comprising 1 to 12% by weight of an acidic group-containing monomer and 99 to 88% by weight of a monomer copolymerizable therewith in the presence of the nucleus/core polymer particle to form at least one intermediate polymer layer which substantially surrounds the nucleus/core polymer particle;

(4) polymerizing an aromatic vinyl monomer alone or copolymerizing a monomer mixture comprising up to 0.5% by weight of an acidic group-containing monomer and at least 99.5% by weight of an aromatic vinyl monomer copolymerizable therewith in the presence of the polymer particle which is prepared in step (3) and comprising the intermediate polymer layer substantially surrounding the nucleus/core polymer particle, to prepare an outer polymer layer which substantially surrounds the polymer particle prepared in step (3);

(5) adding a base to an aqueous dispersion of the polymer particle which is prepared in step (4) and has a multi-layer structure comprising at least four layers, to adjust the pH value of the aqueous polymer dispersion to at least 7; and then (6) adding an aromatic vinyl monomer or a monomer mixture comprising at least 90% by weight of an aromatic vinyl monomer and not larger than 10% by weight of a monomer copolymerizable therewith, to polymerize the aromatic vinyl monomer or copolymerize the monomer mixture in the presence of the polymer particle with the multi-layer structure, prepared in step (5), to form an outermost polymer layer surrounding the outer polymer layer prepared in step (4).

22. A thermal recording material having a thermal recording layer formed on a support, characterized in that an intermediate layer comprising heat-insulating polymer particles is formed between the thermal recording layer and the support, said polymer particles being the bowl-shaped polymer particles as claimed in claim 1.

* * * * *